United States Patent [19]
McMinn

[11] 3,717,058
[45] Feb. 20, 1973

[54] FLYING CUT-OFF PRESS
[75] Inventor: Donald E. McMinn, Romeo, Mich.
[73] Assignee: Eagle Manufacturing Corp., Warren, Mich.
[22] Filed: June 2, 1970
[21] Appl. No.: 42,847

[52] U.S. Cl. ...................83/157, 83/289, 83/292, 83/320, 83/365, 83/369
[51] Int. Cl. ........B23d 25/16, B26d 1/56, B26d 5/40
[58] Field of Search........83/286, 289, 290, 291, 292, 83/293, 318, 320, 365, 369, 370, 372, 157

[56] References Cited

UNITED STATES PATENTS

| 2,641,042 | 6/1953 | Kopp | 83/293 X |
|---|---|---|---|
| 2,623,443 | 12/1952 | Robinson | 83/289 X |
| 2,540,166 | 2/1951 | Frank et al. | 83/292 |
| 3,081,657 | 3/1963 | Harris | 83/294 |
| 3,566,728 | 3/1971 | Ohmasu | 83/292 X |
| 3,310,855 | 3/1967 | Orioli | 83/318 X |
| 3,304,824 | 2/1967 | Hess, Sr. et al. | 83/157 X |

Primary Examiner—Andrew R. Juhasz
Assistant Examiner—James F. Coan
Attorney—Whittemore, Hulbert & Belknap

[57] ABSTRACT

A continuously traveling plastic extrusion passes in line through a cut-off and/or tooling unit mounted on a carriage which travels a limited stroke at the same speed as the extrusion, during which a tooling operation is performed on the extrusion, whereupon the carriage returns to its initial position. Such operation of the tooling is optionally triggered and timed by any one of: (a) a metering wheel which rolls on the advancing extrusion and has a circumference substantially equalling an extrusion length to be cut off and/or tool-formed, the wheel periodically cam-operating a control microswitch; or (b) an end gauging control microswitch which is periodically operated for a limited interval by an extrusion passing through the press; or (c) a photoelectric control switch which is tripped for a limited time by the traveling extrusion interrupting the photoelectric cell beam. The mechanical operations of the tooling unit and carriage are controlled by solenoid controlled valve and cylinder means; and a tooled extrusion piece is automatically discharged from the equipment by synchronized fluid pressure-operated dump means.

7 Claims, 17 Drawing Figures

INVENTOR
DONALD E. McMINN
BY
Whittemore, Hulbert
& Belknap
ATTORNEYS

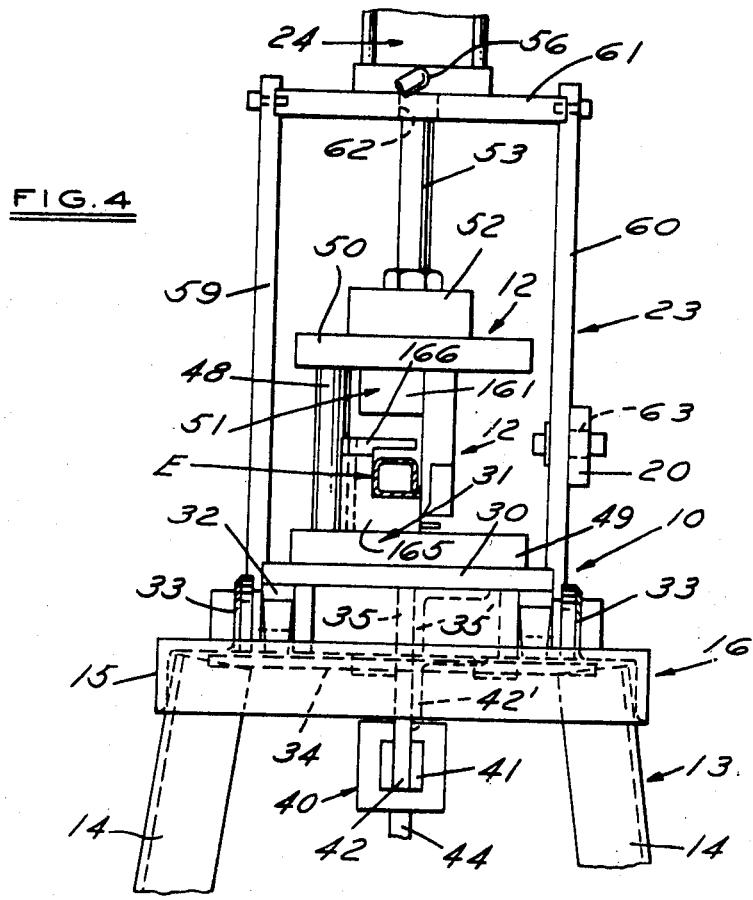
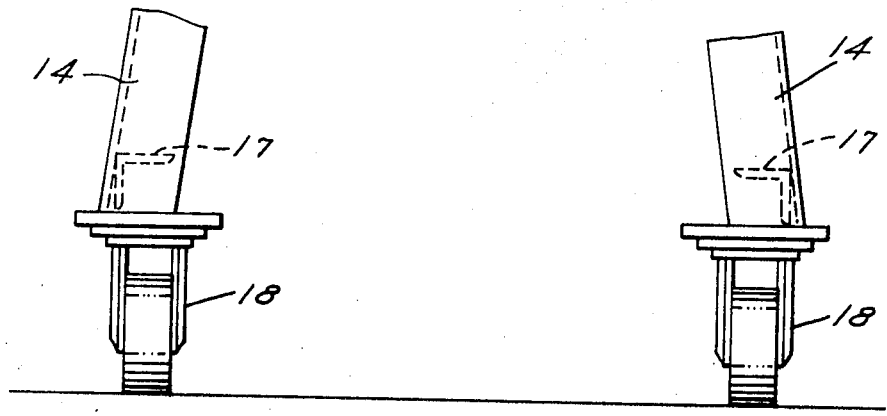
FIG.4

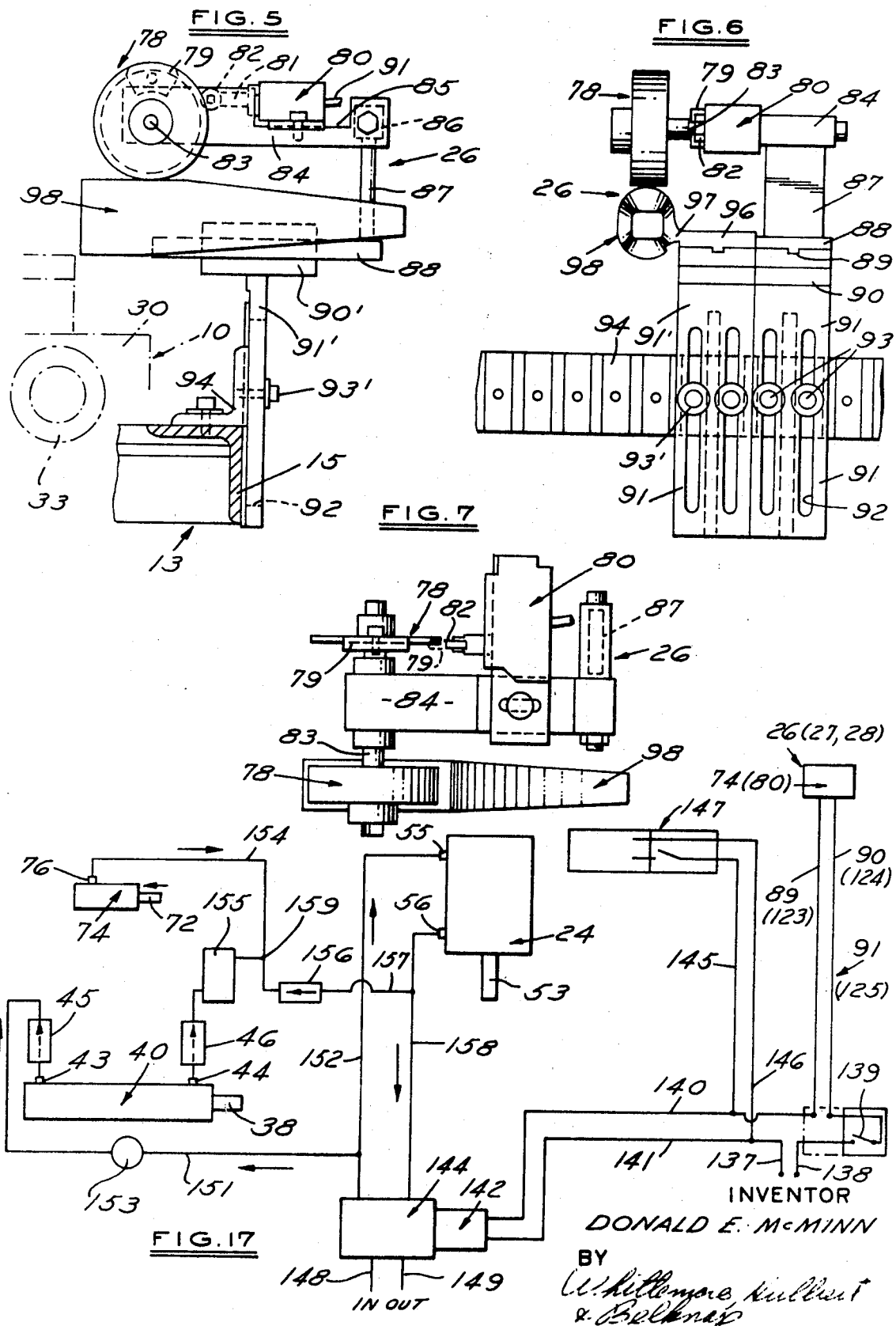

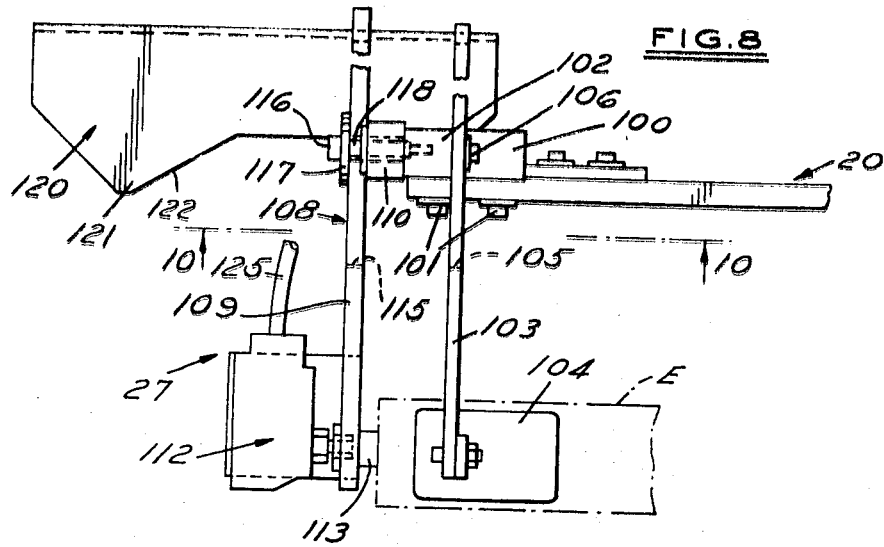
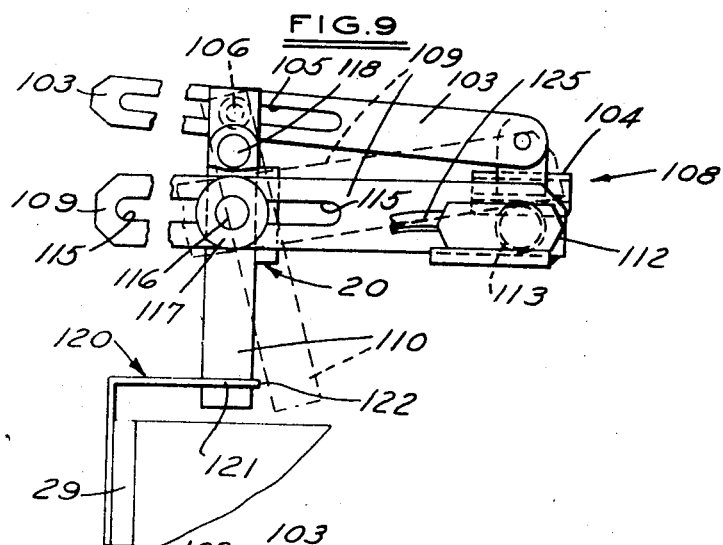
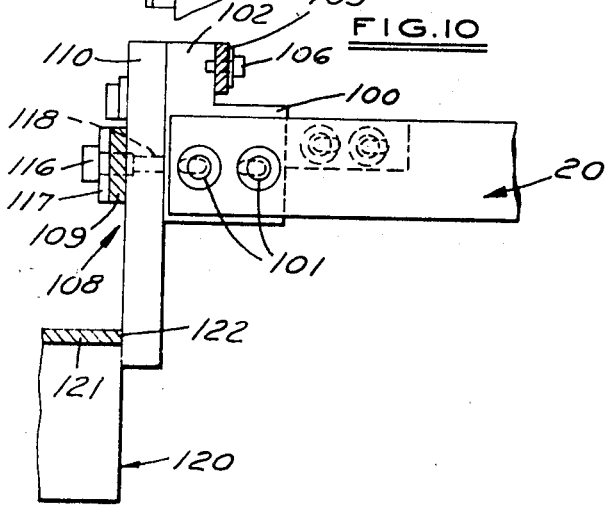

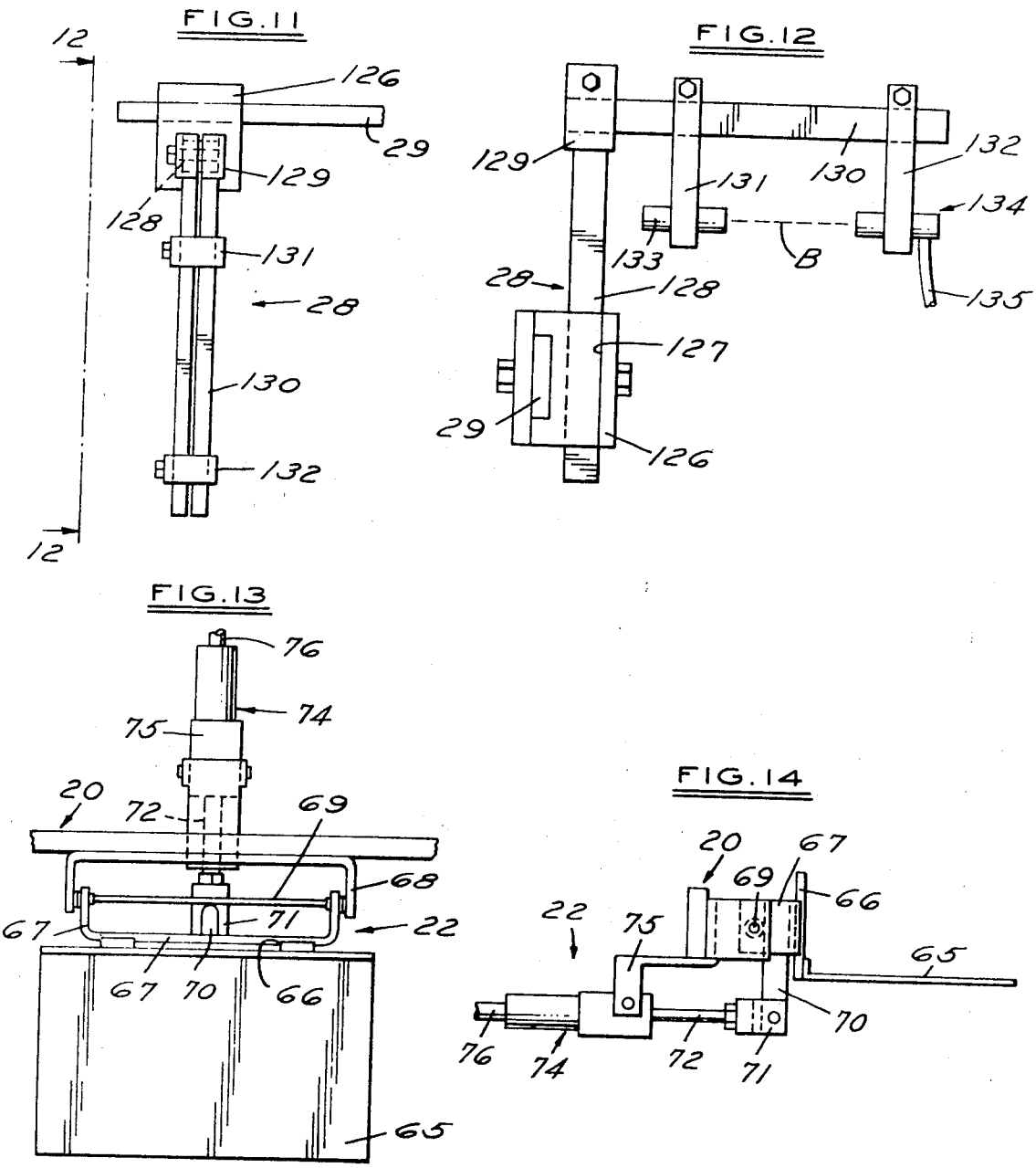

INVENTOR
DONALD E. McMINN
BY
ATTORNEYS 3,717,058

FLYING CUT-OFF PRESS

BACKGROUND OF THE INVENTION — FIELD

The invention finds application in the cut-off, notching, piercing, blanking, routing, etc. of a continuously traveling plastic extrusion, particularly in instances in which it is desirable to avoid the cost of a separate secondary forming operation subsequent to and independent of the extrusion equipment. Obviously, this contemplates a use of the invention in the production of a large variety of extruded plastic or related forms. I am not aware of any prior art dealing with flying type cut-off type or related equipment and pertinent to the improvement as herein shown, described and claimed.

SUMMARY OF THE INVENTION

A reciprocable wheeled carriage is accurately synchronized in a forward operational movement with the travel speed of a continuous extrusion or profile, which enters cut-off and/or like tooling equipment on the carriage after issuing from a conventional extruder. The profile is conventionally cooled upon issue and drawn from the extruder by a known caterpillar or crawler-type puller, by which the extrusion is thus continuously pushed into the tooling. This insures a controlled synchronization of the tool operation which eliminates jamming, buckling and bowing of the extrusion or profile, by reason of the smooth longitudinal movement of the latter at exactly the same speed as the tooling unit on the carriage. The operation of the press equipment is fully automatic, both in regard to the timing of the tool stroke and the timing and extent of the carriage stroke, under the control of any selected one of the three metering wheel-microswitch, tripped end gauge microswitch and photoelectric switch arrangements mentioned in the Abstract. This involves electrical and fluid pressure means and circuitry of a very simple nature for the air-cylinder stroking of the carriage, and for a similar pneumatic operation of a cut-off punch and die and/or other tooling means on the carriage, as well as a synchronized operation of a pneumatically actuated dumping unit to clear a cut extension or profile piece from the line of operation of the press. The return of the carriage, tooling and dump units to original starting positions is under the control of coordinated valve means timed to follow the full termination of movement of the carriage and tooling units from original position.

BRIEF DESCRIPTION OF THE DRAWINGS

FIG. 4 is a fragmentary end elevation, partially broken away, as from the right of FIG. 3, the view also showing in vertical section the outline of a typical extrusion or profile being handled;

FIG. 5 is a fragmentary side elevational view showing one optional embodiment of a carriage and tool synchronization unit of the press, in the form of a metering wheel and microswitch sub-assembly;

FIG. 6 is a fragmentary end elevational view of the unit of FIG. 5, as from the right of that figure;

FIG. 7 is a top plan view of the metering wheel and microswitch unit;

FIG. 8 is a top plan view of a cam-operated end gauge and microswitch sub-assembly or unit constituting a second optional alternative of the synchronization control means of the press;

FIG. 9 is a fragmentary view in end elevation of a portion of the unit of FIG. 8, as from the left of that figure;

FIG. 10 is a view in vertical longitudinal section on line 10—10 of FIG. 8;

FIG. 11 is a schematic, top plan view of a third alternative, photoelectric type synchronization unit optional to the press;

FIG. 12 is an elevational view of the unit of FIG. 11, as from the line 12—12;

FIG. 13 is a fragmentary top plan view showing the automatic, pneumatically operated dump tray unit of the press;

FIG. 14 is an elevational view of the dump unit, as from the left of FIG. 13;

FIG. 17 is a schematic layout of fluid pressure operated components of the equipment and hydraulic and electrical means and circuitry governing the operation thereof.

DESCRIPTION OF PREFERRED EMBODIMENTS

Figure 1:
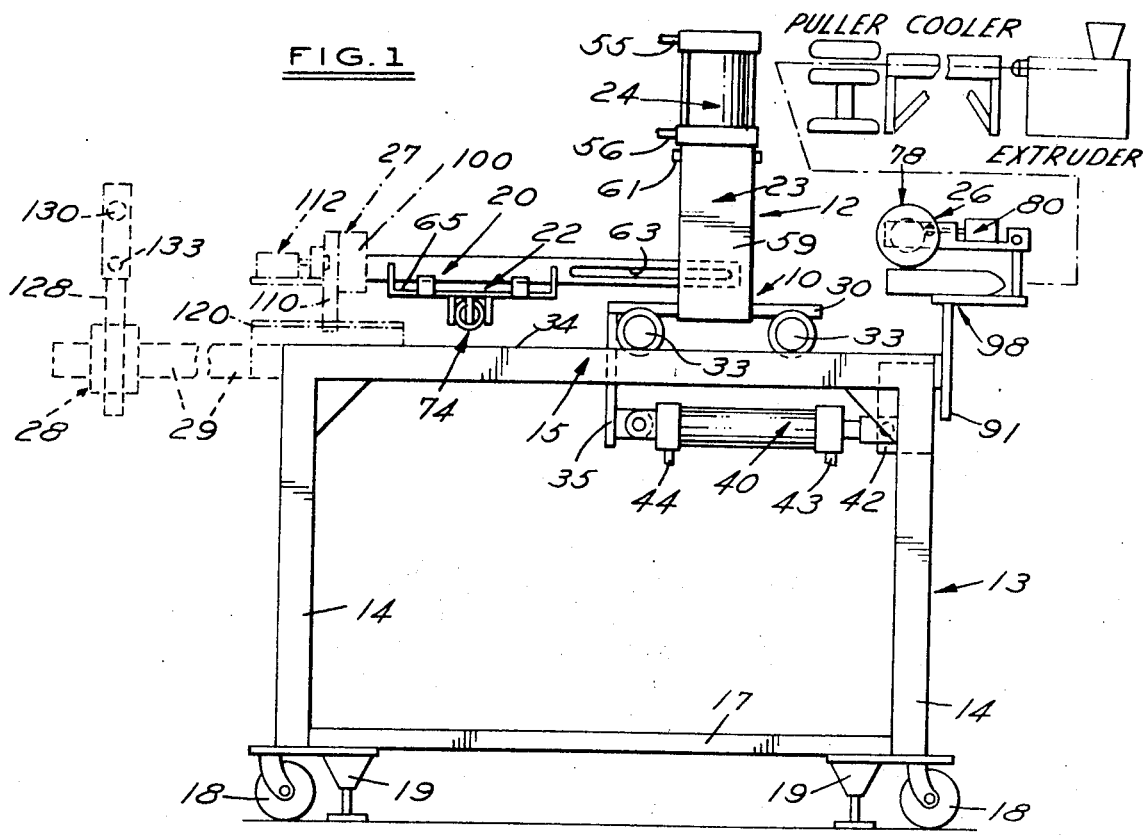
FIG. 1 is a somewhat schematic view of the improved flying-type press installation, as schematically shown in association with conventional extruder, extrusion cooler and extrusion puller equipment; the press is illustrated in this one view as being equipped for optional synchronization control by a metering wheel and microswitch unit (as shown in solid line), by an end gauge and microswitch unit (dot-dash line), or by photoelectric switch means (dotted line)

FIG. 1 of the drawings schematically illustrates three of the optional adaptations of press synchronization unit, mentioned above, as being mounted in association with a reciprocable carriage, generally designated 10 mounting a punch and die or other equivalent forming unit 12 on a rugged translatable framework 13. This frame, as further illustrated in FIGS. 3 and 4, may comprise four angled uprights 14, one pair at each end of the frame and preferably of angle stock, which are welded at the tops thereof to corners of a rectangular upper angle iron frame member 15 and at the bottoms thereof to parallel angle pieces 17. The latter and the uprights 14 are welded downwardly onto plate parts of casters 18; and the bottom framework members 17 are also equipped (FIG. 3) with conventional truck positioning locks 19. In addition, as indicated in FIG. 2, the upper frame member 15 rigidly supports an elongated horizontal extension bar 20, this serves as a mount for a pivotal dump plate or tray unit, generally designated 22, upon which extruded pieces or lengths severed by the tool unit 12 are deposited, and by which they are dropped to clear the press for another operation.

Figure 2:
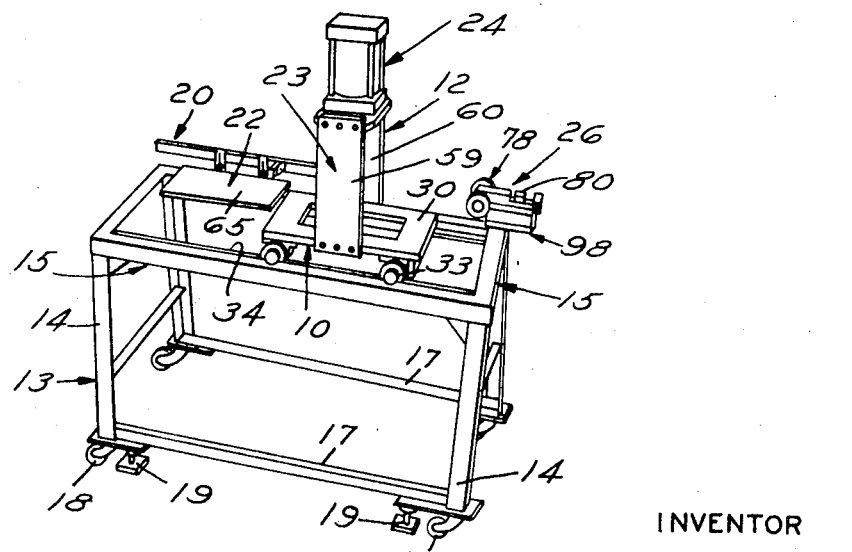
FIG. 2 is a perspective view of the equipment as stripped of its essential die or like tooling means and two alternative switch units, simply illustrating a general assembly of the metering wheel-microswitch synchronization unit, carriage and automatic dump unit as mounted upon a caster-equipped frame.

It is evident that schematic FIG. 2 has been skeletalized for clarity to show only the reciprocable carriage unit 10, a frame superstructure 23 mounting an air cylinder unit 24 for operating the tooling 12, the metering wheel and microswitch embodiment 26 of the tool and carriage synchronization means, and the dump table unit 22. However, FIG. 1 shows collectively the arrangement, in relation to the dump tray unit 22 and the carriage 10, of the second alternative embodiment of tooling synchronization means or unit, shown in dot-dash line and generally designated by the reference numeral 27, which entails the use of the elongated extension bar 20 to connect the unit 27 with the carriage 10; and, as indicated in dotted line in FIG. 1, a third alternative carriage and tooling synchronization means 28 of a photoelectric cell and beam type, which is rigidly mounted to framework 13, as by means of an adjustable horizontal frame extension bar 29.

Figure 3:
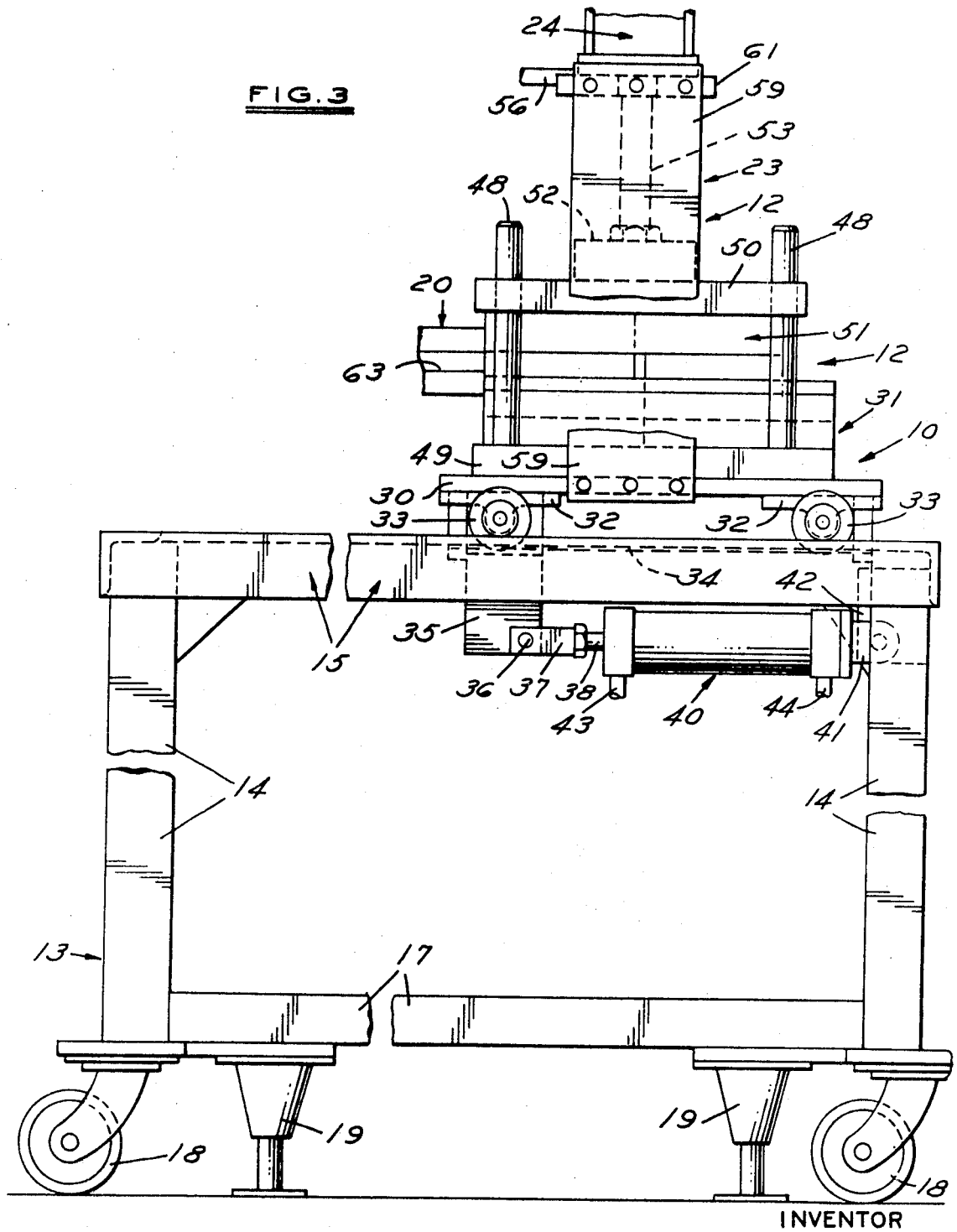
FIG. 3 is a fragmentary side elevational view, partially broken away, illustrating the assembly of the reciprocable tooling carriage and its air-cylinder actuator, the cut-off die or tooling unit and the pneumatic cylinder operator for the latter.

Referring now to FIGS. 3 and 4, the tool-mounting carriage 10 comprises a flat horizontal and rectangular top plate 30 upon which a bottom die member, generally designated 31, of the tooling unit 12 is fixedly mounted in any desired manner. The four corners of the plate 30 are provided with fixed depending journal plates or pads 32 furnishing bearings for pairs of outboard supporting rollers 33; these ride upon appropriate parallel ways atop a flat supporting plate 34 (FIG. 4) suitably supported fixedly on the upper angle iron member 15 of the frame 13.

A rigid, vertically depending bracket 35 is welded to a longitudinal angle member 35' (FIG. 4) on the bottom of upper carriage plate 30, being centered transversely of the latter and providing a pivot pin mount at 36 for a clevis element 37. This is fixed on the end of a plunger rod 38 of a double acting, preferably air-oil type, cylinder 40. Typically, this cylinder will have a 2½ inch bore and a 6 inch stroke. The right hand end of the cylinder 40, as viewed in FIG. 3, is pivotally connected to the frame 13, as by means of a pin and clevis connection 41 to an upright depending plate 42 welded to an angle part 42' of the framework at the transverse center of the latter. Operating fluid is reversibly supplied to and exhausted from the cylinder 40 through appropriate connector fittings 43, 44 at opposite ends of the latter.

As illustrated in schematic FIG. 17, egress of the fluid pressure medium from the carriage cylinder 40 thereof through the lines or fittings 43, 44 is under the control of individual flow control valve devices 45, 46 for the purpose of regulating the speed of stroke of the cylinder plunger 38, hence of the carriage structure 12, as reversibly operated by cylinder 40. The devices 45, 46 do this by exerting a throttling orifice-type action only on the pressure fluid exhausting from the cylinder ends, as indicated by dotted arrows in FIG. 17.

Again referring to FIGS. 3 and 4, a pair of upright posts 48 are fixedly carried by a bed member 49 of the die component 31 of tooling unit 12, which bed member is fixedly mounted by suitable means atop carriage plate 30; and a press platen member 50 carrying a punch component 51 of the tool assembly 12 is slidably guided stably and accurately on the posts 48 for up and down punch strokes. The upper side of platen 50 mounts a fixed block 52 to which an upright plunger 53 of the punch operating cylinder 24 is secured. Opposite vertical ends of the cylinder 24 receive fluid pressure fittings 55 and 56, respectively, which are connected in the fluid pressure circuitry of FIG. 17 in a manner to be described.

Punch cylinder 24 is supported, and its plunger 53 is slidably guided, by the upright carriage superstructure 23, which consists of vertically extending, parallel side plates 59, 60 bolted at their lower ends to sides of the carriage top plate 30 (FIG. 3) and bridged at their upper ends by a bolted rectangular plate 61; and the base of the punch cylinder 24 is fixedly supported suitably by the plate 61.

While the automatic dump unit 22, upon which severed lengths of the tooled extrusion or profile are successively deposited, then dropped to clear the equipment for an ensuing carriage stroke and tool operation, may be mounted on any suitable fixed support at one side of the frame 16, as herein illustrated the unit 22 has its support on the above-mentioned extension bar 20. This member (FIG. 4) is bolted to the carriage superstructure plate 60 to extend horizontally, and it has an elongated slot 63 enabling its position to be adjusted longitudinally as desired. For example, if bar 20 is utilized solely to support the automatic dump unit 22, the latter will usually be located in relation to carriage 10 to place the unit 22 in the most advantageous position to receive cut profile lengths. If, however, bar 20 is also to serve as a support for the end gauge and microswitch embodiment 27, it will be of course located primarily to serve the function of the latter.

Referring to FIGS. 13 and 14 in conjunction with FIGS. 1 and 2, the automatic dump unit 22 comprises a flanged dump tray plate 65 normally held in the horizontal position of FIG. 14 by an upright adapter piece 66 fastened thereto, the piece 66 being in turn welded or otherwise fixedly secured to a U-shaped rear bracket 67 of substantial horizontal length. A similar but somewhat longer U-bracket 68 is mounted to the inner side of the carriage extension bar member 20 (or to a corresponding fixed frame-supported mounting member). Bracket 68 straddles dump tray bracket 67, and two are pivotally coupled at the overlapped end arms thereof by an elongated pivot pin 69.

An upright operating arm 70 is centrally secured to the dump tray piece 65, and this arm is pivotally engaged by a pin and clevis connection 71 carried at the outer end of the plunger 72 of a third fluid pressure cylinder 74. Cylinder 74 extends horizontally, being mounted by an angle bracket 75 to the bottom of the carriage extension bar 20 (or an equivalent fixed support for the dump unit 22).

As distinguished from the punch operating cylinder 24 and the carriage operating cylinder 40, the dump tray cylinder 74 is a single acting one, in that, as pressurized through a line or fitting 76, it maintains the dump tray member 65 in its normal horizontal position as shown in FIGS. 1, 2 and 14. Upon release of cylinder pressure, conventional spring means (not shown) in cylinder 74 biases tray member 65 to drop clockwise (FIG. 14) about its pivot pin 69, thus dumping the cut and otherwise tooled extrusion or profile length out of the path of operation of the equipment.

Now considering FIGS. 5, 6 and 7 in conjunction with FIGS. 1 and 2, the first embodiment 26 of the three mentioned forms of means for triggering and synchronizing the stroke of carriage 10, and its length, essentially comprises a metering wheel 78 bearing a peripheral cam 79, and a conventional microswitch 80 whose operating element or plunger 81 carries a follower roller 82 engageable by the cam 79.

The metering wheel 78 is journaled on a pin 83 projecting laterally from a horizontal bar 84; this bar has a recess 85 seating the microswitch 80, and at one end the bar 84 carries a depending plate 87. Plate 87 is welded at its bottom to a horizontal plate 88 which has a dove-tail adjustable connection at 89 to a further guide plate 90. The connection is in the form of the transverse head of an upright bracket 91 of substantially vertical length which bracket has elongated slots 92 receiving bolts 93. This enables the metering wheel 78 to be adjustably positioned in the vertical sense in relation to the frame 13, as represented by a horizontal angle part 94 bolted onto a frame member 15.

A similar T-bracket 91' is similarly secured adjustably to the angle member thereof, including provisions denoted by primed reference numerals corresponding to those just described; and a horizontal plate 96 mounted by such means has a lateral extension at 97 carrying an extrusion lead-in guide shoe member 98 about which an advancing extrusion is lead under the impelling force of the puller schematically illustrated in FIG. 1 of the drawings.

The shape of the guide 98 corresponds in cross-section to that of the extrusion (shown as E); and the metering wheel 78 rolls in firm contact with the material of the extrusion as supported by the upper surface of guide 98.

In accordance with the invention, the circumference of metering wheel 78 of the synchronization unit 26 equals in length an extrusion or profile part to be severed by the press, possibly plus some slight increment of length affording scrap material. As the wheel 78 rotates to monitor the extrusion length, it initiates in each rotation an electrical signal of a certain duration through the agency of its arcuate-surfaced cam 79 in engaging microswitch 82. This completes an electrical circuit through the leads 89, 90 (FIG. 17) of an electrical cable member 91 of microswitch 80, with resultant energization of a solenoid-controlled valve, as will be later described in connection with FIG. 17. In this fashion the advance and retraction of the carriage 10, and the operation of the tooling 12 mounted by the carriage, are controlled, also the operation of the dump tray unit 22, in b manner to be described.

Structural features of the second alternative embodiment 27 of the carriage tooling synchronizing means are illustrated in FIGS. 8, 9 and 10. Unit 27 is mounted at the left hand end (FIGS. 1, 8 and 10) of the carriage extension bar 20; and for this purpose a mounting block 100 is seated in an end recess of bar 20, being rigidly clamped to the latter by bolts 101. A reduced thickness top extension 102 of the block 100 serves as a mount for a laterally extending stripper arm 103, which fixedly carries at its outer end a mildly arcuate horizontal stripper plate 104. The function of plate 104 is to act downwardly upon the advancing end of the extrusion E and insure a proper engagement of that end with microswitch means, to be described.

The stripper plate arm 103 is adjustable in relation to the mounting block 100, being provided with an elongated slot 105 receiving a clamp bolt 106 which takes into the top portion 102 of block 100, as shown in FIGS. 8 and 10; this allows for an adjustable positioning of the stripper plate 104 as desired in relation to extrusion E. Once adjusted, the stripper plate is motionless in relation to carriage extension bar 20.

The mounting block 100 on carriage bar 20 also serves as a pivotal support for a microswitch carrying arm assembly, generally designated by the reference numeral 108. This assembly comprises an elongated, laterally extending arm 109 having an upright depending tappet member 110 fixedly secured thereto for operation as a unit therewith.

Arm 109 has a conventional microswitch 112 fixedly mounted on the outer end thereof; and the operating button 113 of this switch extends from the right hand side (FIG. 8) of mounting arm 110, toward which the extrusion E approaches, the latter being guided by stripper plate 104 for a proper initial engagement of the extrusion end with microswitch button 113, and resultant energization of microswitch 112 for a predetermined time interval.

Like the stripper plate arm 103, the microswitch arm 109 is provided with an elongated slot 115 permitting a lateral adjustment of the arm 109 in relation to the depending tappet arm 110 which operates unitarily therewith. This adjustable mount includes a bolt 116 and large size washer 117 clamping the arm 109 to tappet 110 once the desired adjustment if made. Bolt 116 is located at a point located substantially beneath the top of the tappet 110; and at a point somewhat above this connection another bolt 118 threads into the mounting block 100 on extension bar 20, serving as a pivot for the swing of the microswitch and tappet unit 108 in a vertical plane at 90° to the path of travel of extrusion E.

In order to control this swing, a fixed cam plate 120, is fixedly mounted on the machine frame 16. This cam may be in the form of an angle-shaped member (see FIG. 9) fixedly secured in an appropriate fashion to the fixed frame extension bar 29, referred to above in connection with FIG. 1. Plate 120 has its upper flange portion shaped to provide a projecting cam formation 121. This formation presents a cam surface 122 adapted to be engaged by the depending tappet member 110 of the microswitch and tappet sub-assembly 108, causing the latter to swing counter-clockwise (FIG. 9) above its pivotal axis at 118 on the mounting block 100. The result is that the operating or contact button 113 of microswitch 112 is elevated out of its position of engagement by the extrusion E, thus terminating the interval of energization of switch 112 and the electrical circuit through the leads 123, 124 (FIG. 17) of an electrical connector cable 125 serving that switch.

The third optional synchronization embodiment 28, involving a photo-electric operation, is more or less schematically illustrated in FIGS. 11 and 12 of the drawings, to be considered in conjunction with FIG. 1. The unit 28 comprises a bracket 126 adapted to be bolted, screwed or otherwise fixedly (and preferably adjustably) mounted on the frame extension bar 29, enabling the unit 28 to be positioned as desired in relation to an extrusion traversing the equipment. Obviously, such position may well be considerably more to the right than appears in FIG. 1, all depending upon the length of the extrusion piece which is to be processed. Bracket 126 is provided with a vertical bore 127 for the slidably adjusting reception of an upright post 128, which carries at its upper end a split clamping block 129. This piece in turn receives a split tubular, horizontal cross-rod 130 upon which a pair of releasable clamp arms 131, 132 are slidably adjustable in relation to one another and in relation to the path of travel of the extrusion E. Typically, the arm 131 will mount an appropriate light source 133 capable of emitting a small but intense light beam B; while the other arm 132 similarly mounts a conventional photoelectric cell device 134, whose output will be connected, of course is using suitable amplifying sub-circuitry (not shown), through electrical conductor or cable means 135. It will be appreciated that this conductor will contain electrical leads corresponding to the leads 89, 90 of the metering wheel-microswitch synchronization embodiment 26 and the leads 123, 124 of the end gauge and microswitch embodiment 27.

Thus, as depicted in schematically FIG. 17, a single electrically responsive unit is to be considered as representing in a generic way the three alternative synchronization units 26, 27, 28 described above. When the beam B of FIG. 12 is interrupted by the passage of the end of an extrusion E, a signal originates which is employed in essentially the same fashion as signals originating in the microswitches 80 and 112 of the other optional units 26 and 27.

Turning now to FIG. 17, input terminal leads 137, 138 respectively connect, under the master control of an instrument panel switch 139, with the synchronization switch control lead 90 (or 124) to apply power to the microswitch 74 (or 78) or to photoelectric device 134, the power supply circuit for the units 26, 27, 28 being completed through the lead 89 (or 123) once the switch in question is closed. The last named lead connects with a conductor 140 which, along with another conductor 141, is wired to terminals of an electrical solenoid 142 controlling a four-way air valve 144, typically having ¾-inch ports. Leads 140, 141 also supply, through branch conductors 145, 146, a conventional electrical counter-type switch, generally designated 147, which will be appropriately mounted to the press frame 13, and the function of which is to count the number of carriage strokes and tool cycles performed by the tool unit 12, all as triggered electrically by impulses originating at one of the three synchronization units 26, 27, 28.

A fluid pressure operating medium is supplied to and discharged from the four-way valve 144 through the agency of a supply conduit 148 and a return conduit 149, the fluid preferably being an air-oil type for improved consistency of operation of the several cylinder devices 24, 40 and 74.

Passing through valve 144, the latter operated under the control of the synchronization units, the flow of pressure fluid divides into branch pressure lines 151, 152 connected respectively to the fitting 43 at one end (left hand in FIG. 17) of the carriage cylinder 40 and the upper fitting 55 of the punch cylinder 24, the direction of flow being indicated in each case by solid line arrows, and a conventional pressure regulator 153 is disposed in the line 151. As has been mentioned above, the pressure fluid enters both ends of the carriage cylinder 40 through the flow control devices 45, 46, and while these devices allow an unobstructed flow of pressure into one end or the other of the cylinder 40, they are adjustable to impose a throttling or flow impeding action as desired as the fluid departs either end of cylinder 40, in the direction through said devices as indicated by dotted arrows in FIG. 17.

As the cylinders 40 and 24 are thus pressurized to shift the respective carriage and punch plungers 38, 53 in an operative stroke, the pressure liquid exhausts, under the described control to regulate carriage stroke speed in the case of cylinder 40, from the respective carriage and punch cylinder fittings 44, 56. A speed control of the punch cylinder plunger 38 is usually unnecessary.

As the cylinders 40, 24 are thus pressurized, the pressure in the dump tray cylinder 74 is relieved, flowing through a line 154 in the direction of the solid line arrow (FIG. 17) and entering an air-oil receiver tank 155. This flow is under the control of a normally closed three-way valve 156 interposed in a conduit 157 which connects between the second fluid pressure line 158 of punch cylinder 24 and a juncture at 159 of the tank 155 and dump tray cylinder line 154. The pressure line 158 connects from the lower cylinder fitting 56 of punch cylinder 24 to a port of the four-way solenoid-controlled valve 144.

Accordingly, with pressure voided from the dump cylinder 74, its built-in return spring (not shown) causes the plunger 72 of dump tray cylinder 74 to shift to the left, as viewed in FIG. 14, thus swinging dump tray 65 clockwise to discharge a completed extrusion piece and clear the press for another cycle.

Upon deactivation of the synchronization switch unit 26, 27 or 28, the flow of pressure fluid in the system is reversed. The punch cylinder plunger 53 is driven upwardly (FIG. 17), fully retracting the press punch assembly 51; and in doing so the latter operates the multi-position three-way switch 156. This in turn operates to control the flow of fluid to restore the carriage 10 and the dump tray 65 to normal or original position by pressurizing carriage cylinder 40 at its fitting 44 and the dump cylinder 74 at its fitting 76.

Figure 15:
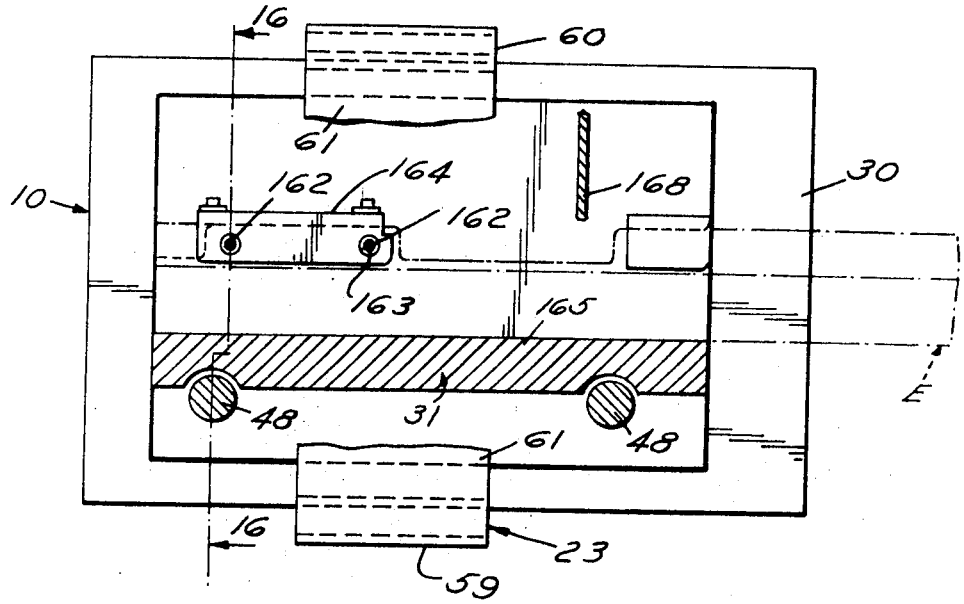
FIG. 15 is a top plan view, partially broken away and sectioned horizontally on broken line 15—15 of FIG. 16, illustrating the general nature of a punch-die unit contemplated to be typically associated with the press equipment.
Figure 16:
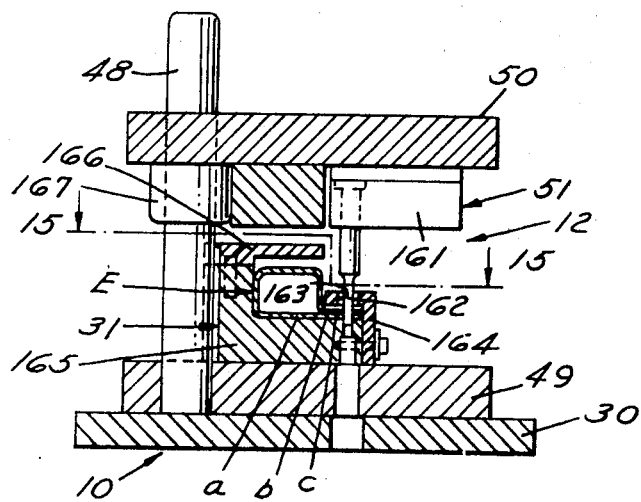
FIG. 16 is a view in transverse vertical section on broken line 16—16 of FIG. 15.

FIGS. 15 and 16 illustrate a typical punch and die arrangement of the carriage-borne tooling unit 12 in operating upon the extrusion E. The latter is shown as being in the form of a generally tubular and rectangularly sectioned body portion *a* having opposed pairs of top, bottom and side walls, one of the latter presenting superposed lateral flanges *b* and *c* which are to be punched.

To this end, the punch section 51 of the tooling unit 12 includes a mounting block 161 appropriately supported on the lower face of press platen 50 and mounting a pair of spaced punches 162. These are adapted to be guided in openings 163 of a die stripper member 164 of inverted L-shaped cross section, which member is bolted to the side of a die block 165 mounted atop the bottom bed member 49 of tooling unit 12. Block 165 and bed 49, as well as the top plate 30 of carriage 10, are provided with aligned openings through which punched slugs drop beneath the carriage.

The die block 165 has a bolted upper plate 166 beneath which the extrusion E is received and vertically restrained in the operation of punches 162 thereon. As indicated above, the punch platen 50 is guided by the two upright rods or posts 48, which will typically be 8 inches long and 1 inch in diameter, working in bronze plated bushings 167 on platen 50.

FIG. 15 shows the punch structure as including a cut-off blade 168, which may be located at any desired place beneath and carried on the punch platen 50.

It is seen that the invention affords a relatively simple and inexpensive press structure of a readily translatable nature, adapting it to be positioned conveniently for in-line cooperation with the extruder, cooler and puller units appearing in FIG. 1, or any equivalent thereof handling a continuously traveling item. It avoids a need for a separate independent tool operation subsequent to the formation and issuance of the product; and the use of synchronized tool mounting carriage provisions insures a smooth, snag-free handling of the extrusion or other product in travel.

I claim:

1. A flying type press for operating on a continuously traveling, generally tubular extrusion or similar length, comprising a support, a carriage movable longitudinally on said support in the direction of travel of said length, means to move said carriage in said direction in a carriage-operating stroke, which stroke is synchronized in speed with the travel speed of the length, a tool unit mounted on and transported by said carriage and operative during said stroke to perform a tool operation on said length, means to actuate said tool unit for said operation, a longitudinally fixed dump unit disposed on the side of said tool unit downstream of the carriage stroke during operation of the tool unit, said dump unit having means actuating the same transversely downwardly out of a normal supporting position relative to a portion of said length, and circuitry to trigger the operation of said carriage moving and tool and dump unit actuating means, including an electrical switch unit electrically responsive to the presence or movement of said length, and control means governed in response to signal from said switch unit to control said carriage moving and tool and dump unit actuating means, said electrical switch unit comprising a metering wheel engaging and rotated by said traveling tubular length, a fixed guide member at least partially surrounded by said length in the travel thereof and sustaining a tubular wall thereof engaged by said metering wheel, and a microswitch cam-operated by said wheel to time the operation of said carriage moving and tool unit actuating means.

2. A flying type press for operating on a continuously traveling, generally tubular extrusion or similar length, comprising a support, a carriage movable longitudinally on said support in the direction of travel of said length, fluid pressure cylinder means to move said carriage in said direction in a carriage operating stroke substantially equal in speed with the travel speed of the length, a tool unit mounted on and transported by said carriage and operative during said stroke to perform a tool operation on said length, fluid pressure cylinder means to actuate said tool unit for said operation, a longitudinally fixed dump unit disposed on the side of said tool unit downstream of the carriage stroke during operation of the tool unit, said dump unit having means actuating the same transversely downwardly out of a normal supporting position relative to a portion of said length, and automatically acting fluid pressure and electrical circuitry to trigger the operation of said carriage moving and tool and dump unit actuating means, including an electrical switch unit electrically responsive to the presence or movement of said length, and fluid pressure control means governed in response to signal from said switch unit to control said fluid pressure circuitry and cylinder means, said electrical switch unit comprising a metering wheel engaging and rotated by said traveling tubular length, a fixed guide member at least partially surrounded by said length in the travel thereof and sustaining a tubular wall thereof engaged by said metering wheel, and a microswitch cam-operated by said wheel to time the operation of said carriage moving and tool unit actuating means.

3. The press of claim 1, in which said tool unit comprises means to cut off a piece from said traveling length, said dump unit having a normally horizontal part acting to support the cut piece until the dump unit is thus actuated downwardly.

4. The press of claim 2, in which said tool unit comprises means to cut off a piece from said traveling length, said dump unit having a normally horizontal part acting to support the cut piece until the dump unit is thus actuated downwardly.

5. A flying type press for operating on a continuously traveling extrusion or similar length presenting opposed and transversely spaced wall portions, comprising a support, a carriage movable longitudinally on said support in the direction of travel of said length, means to move said carriage in said direction in a carriage operating stroke, which stroke is synchronized in speed with the travel speed of the length, a fixed guide shoe having an element supporting and spacing said wall portions of the length from one another as the carriage thus moves and the length travels, a tool unit mounted on and transported by said carriage and operative during said stroke to perform a tool operation on said length, means to actuate said tool unit for said operation, and circuitry to trigger the operation of said carriage moving and tool unit actuating means, including an electrical switch unit electrically responsive to the presence or movement of said length, and control means governed in response to signal from said switch unit to control said carriage moving and tool unit actuating means.

6. A flying type press for operating on a continuously traveling tubular extrusion or similar length, presenting opposed and transversely spaced wall portions, comprising a support, a carriage movable longitudinally on said support in the direction of travel of said length, fluid pressure cylinder means to move said carriage in said direction in a carriage operating stroke substantially equal in speed with the travel speed of the length, a fixed guide shoe around which said tubular length passes in travel, said shoe having means supporting and spacing said wall portions of the length from one another as the carriage thus moves and the length travels, a tool unit mounted on and transported by said carriage and operative during said stroke to perform a tool operation on said length, fluid pressure cylinder means to actuate said tool unit for said operation, a longitudinally fixed dump unit disposed on the side of said tool unit downstream of the carriage stroke during operation of the tool unit, said dump unit having means actuating the same transversely downwardly out of a normal supporting position relative to a portion of said length, and automatically acting fluid pressure and electrical circuitry to trigger the operation of said carriage moving and tool and dump unit actuating means, including an electrical switch unit electrically responsive to the presence or movement of said length, and fluid pressure control means governed in response to signal from said switch unit to control said fluid pressure circuitry and cylinder means.

7. The press of claim 6, in which said tool unit comprises means to cut off a piece from said traveling length, said dump unit having a normally horizontal part acting to support the cut piece until the dump unit is thus actuated downwardly.

* * * * *